(12) United States Patent
Kulikov

(10) Patent No.: US 9,867,011 B2
(45) Date of Patent: Jan. 9, 2018

(54) IDENTIFYING PROXIMITY HISTORY OF COMPUTER DEVICES

(71) Applicant: SKIA, INC., San Francisco, CA (US)

(72) Inventor: Vitaliy Kulikov, San Francisco, CA (US)

(73) Assignee: Skia, Inc., San Francisco, CA (US)

( * ) Notice: Subject to any disclaimer, the term of this patent is extended or adjusted under 35 U.S.C. 154(b) by 0 days.

(21) Appl. No.: 15/117,680

(22) PCT Filed: Mar. 5, 2015

(86) PCT No.: PCT/US2015/019022
§ 371 (c)(1),
(2) Date: Aug. 9, 2016

(87) PCT Pub. No.: WO2015/134781
PCT Pub. Date: Sep. 11, 2015

(65) Prior Publication Data
US 2016/0353245 A1    Dec. 1, 2016

Related U.S. Application Data

(60) Provisional application No. 62/006,735, filed on Jun. 2, 2014, provisional application No. 61/948,793, filed on Mar. 6, 2014.

(51) Int. Cl.
*H04W 4/02* (2009.01)
*G06Q 30/02* (2012.01)
(Continued)

(52) U.S. Cl.
CPC ............ *H04W 4/025* (2013.01); *G06Q 30/02* (2013.01); *G06Q 50/01* (2013.01); *H04L 43/16* (2013.01);
(Continued)

(58) Field of Classification Search
CPC ....................................................... H04W 4/02
(Continued)

(56) References Cited

U.S. PATENT DOCUMENTS 8,359,643 B2    1/2013  Low et al.
2009/0006336 A1  1/2009  Forstall et al.
(Continued)

OTHER PUBLICATIONS

International Search Report and Written Opinion for International Patent Application No. PCT/US2015/019022, dated Jun. 11, 2015, 14 pages.

*Primary Examiner* — Michael T Vu
(74) *Attorney, Agent, or Firm* — Lowenstein Sandler LLP

(57) ABSTRACT

A proximity detector miming on a server receives a request from an origin device to identify a proximity history of the origin device with one or more target devices and retrieves context information from the origin device and from the target devices. The proximity detector compares the context information from the origin device to the context information from the target devices that is within a time threshold of the context information from the origin device and generates a list of a subset of the target devices that satisfy a proximity threshold with respect to the origin device based on comparing the context information that is within the time threshold. The proximity detector generates an ordered list of events, each event indicating when a target device satisfies the time threshold and the proximity threshold with respect to the origin device, and provides the ordered list of events to the origin device.

20 Claims, 9 Drawing Sheets

(51) Int. Cl.
*G06Q 50/00* (2012.01)
*H04L 12/26* (2006.01)
*H04L 12/58* (2006.01)
*H04L 29/08* (2006.01)

(52) U.S. Cl.
CPC .............. *H04L 51/32* (2013.01); *H04L 67/22* (2013.01); *H04L 67/306* (2013.01)

(58) Field of Classification Search
USPC .......................................... 455/456.1–456.6
See application file for complete search history.

(56) References Cited

U.S. PATENT DOCUMENTS

| | | |
|---|---|---|
| 2010/0027780 A1 | 2/2010 | Jung et al. |
| 2011/0191352 A1 | 8/2011 | Jones et al. |
| 2013/0151593 A1* | 6/2013 | Shin ........................ H04L 67/42 709/203 |
| 2013/0169434 A1* | 7/2013 | McCown ................ G08B 21/00 340/540 |
| 2013/0297704 A1* | 11/2013 | Alberth, Jr. ........... H04L 67/303 709/205 |
| 2013/0342391 A1 | 12/2013 | Hoang et al. |

* cited by examiner

IDENTIFYING PROXIMITY HISTORY OF COMPUTER DEVICES

REFERENCE TO EARLIER FILED APPLICATION

This application is a U.S. Non-provisional patent application filed under 35 U.S.C. 371 of International Patent Application PCT/US2015/019022, which claims the benefit of priority to U.S. Provisional Patent Application No. 61/948,793, filed Mar. 6, 2014, and to U.S. Provisional Patent Application No. 62/006,735, filed Jun. 2, 2014, both of which are incorporated herein, in their entirety, by this reference.

TECHNICAL FIELD

This disclosure relates to the field of proximity detection and, in particular, to identifying proximity history of computer devices.

BACKGROUND

Location-based services are a general class of computer program-level services used to include specific controls for location and time data as control features in computer application programs. As such, location-based services have a number of uses in social networking today as an entertainment and search service, which is accessible with mobile devices through the mobile network and which uses information on the geographical position of the mobile device.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
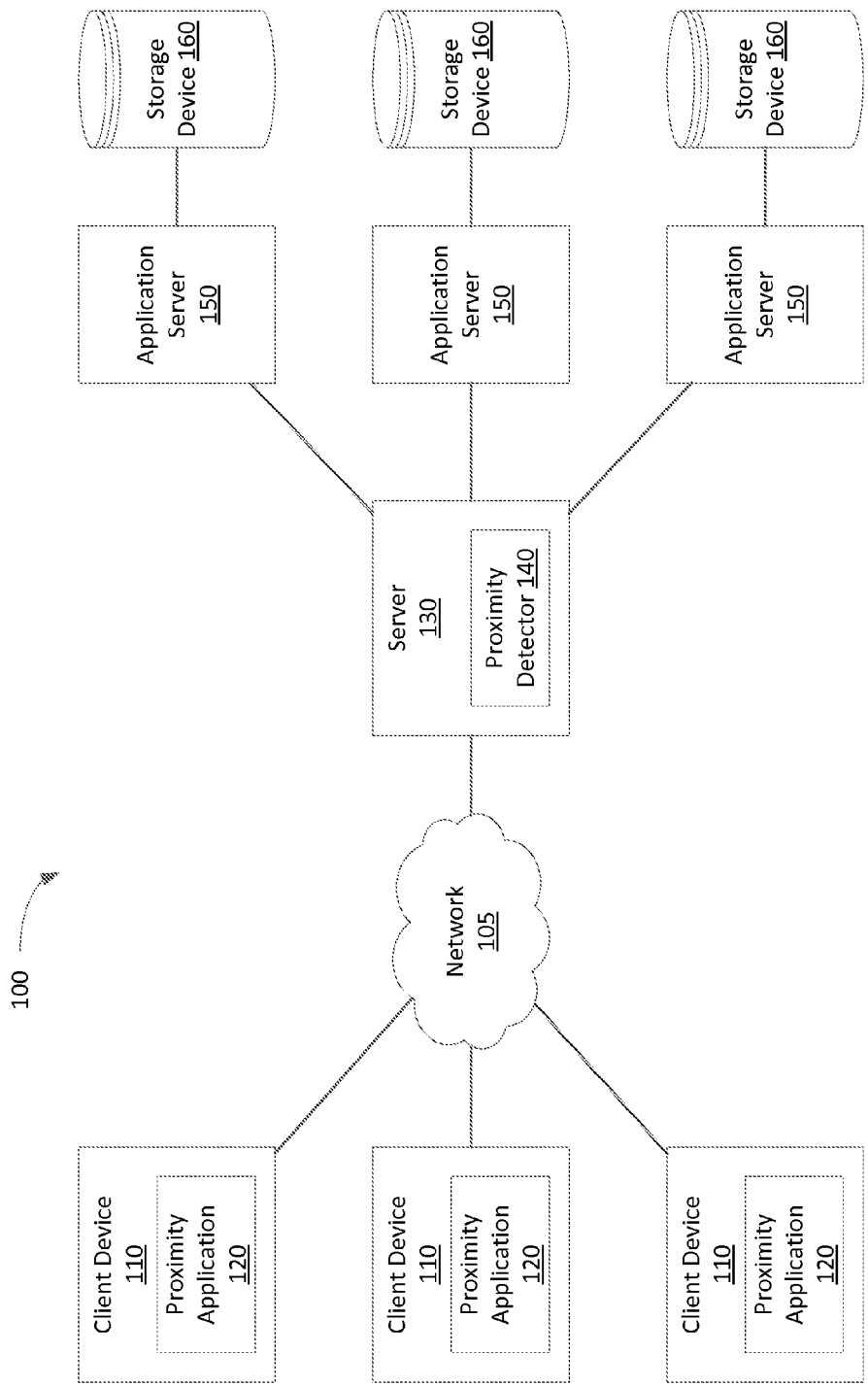
FIG. 1 is a block diagram illustrating a computing environment for identifying proximity history of computer devices, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for identifying proximity history of computer devices. In one embodiment, the client device includes a beacon detector that detects signal beacons. The beacons can include, for example, signals from Wi-Fi® access points, such as stationary or mobile wireless access points, Bluetooth® signals from other wireless devices, or other signals. A beacon context module in the client device generates a beacon context indicating the beacons detected by the beacon detector. In one embodiment, each beacon has a unique identifier, and the beacon context includes a list, concatenation, or other format including the unique identifier of each beacon detected by the beacon detector. In other embodiments, the beacon context additionally includes an indication of the signal strength of each detected beacon, an indication of the beacon type, a plurality of time ranges indicating when the beacon was detected, and possibly other information. The client device may send the beacon context to a server periodically, in response to a request from the server, or in response to a change in the beacon context.

In one embodiment, the client device includes a location coordinate circuit operable to determine a location (e.g., location coordinates) of the client device. The location coordinate circuit may determine the location of the client device in a number of ways including, for example, using the Global Positioning System (GPS), cellular triangulation using the location of known cellular network towers, triangulation using wireless local area networks (WLANS), such as Wi-Fi® triangulation using the location of known stationary Wi-Fi® access points, or other techniques. A location context module in the client device generates a location context indicating a plurality of recent locations of the device determined by the location coordinate circuit. In one embodiment, the location context includes a list, concatenation, or other format including coordinates of each recent device location determined by the location coordinate circuit. In other embodiments, the location context additionally includes an indication of the technique used to determine each set of the coordinates, an indication of the reliability of each set of the coordinates, a plurality of time ranges indicating when each set of the coordinates was valid, and possibly other information. The client device may send the location context to a server periodically, in response to a request from the server, or in response to a change in the location context.

In one embodiment, upon receiving the beacon context from the client device, a beacon context record module in the server stores the beacon context in beacon context records. In one embodiment, the beacon context record module maintains the beacon context records in a storage device. The beacon context records may include a database or other data storage with data entries indexed by the device and a timestamp of the beacon context.

In one embodiment, upon receiving the location context from the client device, a location context record module in the server stores the location context in location context records. In one embodiment, the location context record module maintains the location context records in a storage device. The location context records may include a database or other data storage with data entries indexed by the device and a timestamp of the location context.

In one embodiment, the server receives a request from a client device to identify a proximity history of the client device (i.e., the "origin" device) with one or more other client devices (i.e., "target" devices). In one embodiment, a proximity detector in the server determines the proximity history between the origin client device and the target client devices. In one embodiment, the proximity detector identifies historical beacon context records of the origin client device and each of the target client devices and for similar timestamps (e.g., timestamps within some threshold separation of time) compares the beacon context records of the origin client device to the beacon context records of each of the target client devices. In one embodiment, the proximity detector identifies historical location context records of the origin client device and each of the target client devices and for similar timestamps compares the location context records of the origin client device to the location context records of each of the target client devices.

In one embodiment a beacon context handling module determines a number of beacons that are shared between any two beacon contexts with similar timestamps and uses that number as a measure of proximity of the corresponding client devices (e.g., the higher the number of shared beacons at a given point in time or within a period of time, the closer the devices likely are to one another). The beacon context handling module further determines a subset of beacon contexts with similar timestamps for which the beacon contexts satisfy a proximity threshold. For example, the proximity threshold may specify a minimum number of beacons (e.g., two beacons, three beacons, or some other number of beacons) that should be shared between the beacon contexts in order to determine a sufficient proximity. In one embodiment, for each set of similar timestamps, the beacon context handling module generates a list of the subset of target client devices that satisfy the proximity threshold based on the proximity of the target devices to the origin client device.

In one embodiment, a location context handling module determines an estimate of the geographical distance between any two location contexts with similar timestamps and uses that estimate as a measure of proximity of the corresponding client devices (e.g., the smaller the estimate, the closer the devices likely are to one another). The location context module further determines a subset of location contexts with similar timestamps for which location contexts satisfy a proximity threshold. For example, the proximity threshold may specify a maximum distance (e.g., ten meters, one hundred meters, or some other distance) that the distance estimate between the location contexts should not exceed in order to determine sufficient proximity. In one embodiment, for each set of similar timestamps, the location context handling module generates a list of the subset of target client devices that satisfy the proximity threshold based on the proximity of the target devices to the origin client device.

In one embodiment, an event interpreter on the server, upon receiving, for each set of similar timestamps, a list of the target client devices that satisfy the proximity threshold with regard to the origin client device, generates an ordered list of time intervals (i.e., "events") during which the origin client device and some or all of the target client devices are interpreted to be in proximity and provides the ordered list to the origin client device.

The client device may receive the ordered list of time intervals during which the origin client device and some of the target client devices are interpreted to be in proximity. The method described herein can be used to estimate the client device proximity history with one or more other client devices. The method can work indoors and can be sensitive enough to identify devices in very close proximity (e.g., within 10-20 meters). This allows the client device to determine a proximity history with other client devices (and through the use of user profiles, other individuals and entities). In turn, the proximity history can be used for a multitude of tasks, including keeping track of user social interactions, keeping track of user interactions with businesses, annotating and organizing media, media sharing, estimating social and geographical affinity of users, and other tasks.

FIG. 1 is a block diagram illustrating a computing environment for identifying proximity history of computer devices, according to an embodiment. In one embodiment, computing environment 100 includes multiple client devices 110 and one or more servers 130. Client devices 110 and server 130 may be connected through a series of one or more networks 105, which may be, for example, a public network (e.g., the Internet), a private network (e.g., a local area network (LAN) or wide area network (WAN)), a wired network (e.g., Ethernet network), a wireless network (e.g., an 802.11 network or a Wi-Fi® network), a cellular network (e.g., a Long Term Evolution (LTE) network), routers, hubs, switches, server computers, and/or a combination thereof. In another embodiment, client devices 110 and server 130 may have a direct connection between them. The illustrated embodiment shows three client devices 110 and one server 130, however, in other embodiments, there may be any number of client devices and servers, and computing environment 100 may include additional and/or different devices.

Each client device 110 may be, for example, a personal computer (PC), workstation, laptop computer, tablet computer, mobile phone, personal digital assistant (PDA) or the like. In one embodiment, client devices 110 may each include transmitter used to provide signals to server 130 over network 105. The transmitted signals may include, for example, radio-frequency identification (RFID) signals, Bluetooth® signals, near field communication (NFC) signals, mobile communications signals, or some other type of communications signal. In one embodiment, client devices 110 each include a receiver to receive signals from server 130. The received signals may be of the same or similar type as the transmitted signals. Each client device 110 may also include a beacon detector to detect beacons in the vicinity of the client device 110 and/or a location coordinate circuit operable to determine a location of the client device 110. The beacons can include, for example, Wi-Fi® access points, such as stationary or mobile wireless access points. Additionally, in one embodiment, each client device 110 may include a proximity application 120. In one embodiment, the proximity application 120 can periodically generate a beacon context using the beacons detected by the beacon detector and provide the beacon context to server 130 over network 105. In one embodiment, the proximity application 120 can periodically generate the location context using the device location determined by the location coordinate circuit and provide the location context to server 130 over network 105. In one embodiment, proximity application 120 can receive an indication of time intervals during which the client device 110 running proximity application 120 is interpreted to be in proximity to one or more other client devices 110. Additional details of proximity application 120 are provided below.

Server 130 may be any computing device, such as computing system 900, described below with respect to FIG. 9. In one embodiment, server 130 may include one or more computing devices (such as a rack mount server, a router computer, a server computer, a personal computer, a mainframe computer, a laptop computer, a tablet computer, a desktop computer, etc.), data stores (e.g., hard disks, memories, databases), networks, software components, and/or hardware components. In one embodiment, server 130 may include proximity detector 140. Proximity detector 140 can communicate with the proximity applications 120 in each of client devices 110 to determine a proximity history of a given client device 110 with one or more other client devices 110 and provide the proximity history to the requesting client device 110. Additional details of proximity detector 140 are provided below. In one embodiment, server 130 may be an endpoint of a distributed server system. The distributed server system may include physical computing devices (e.g., multiple application servers 150) and multiple storage components 160 (e.g., multiple drives or multiple databases). In one embodiment, each storage component 160 may be a memory (e.g., random access memory), a cache, a drive (e.g., a hard drive), a flash drive, a database system, or another type of component or device capable of storing data.

Figure 2:
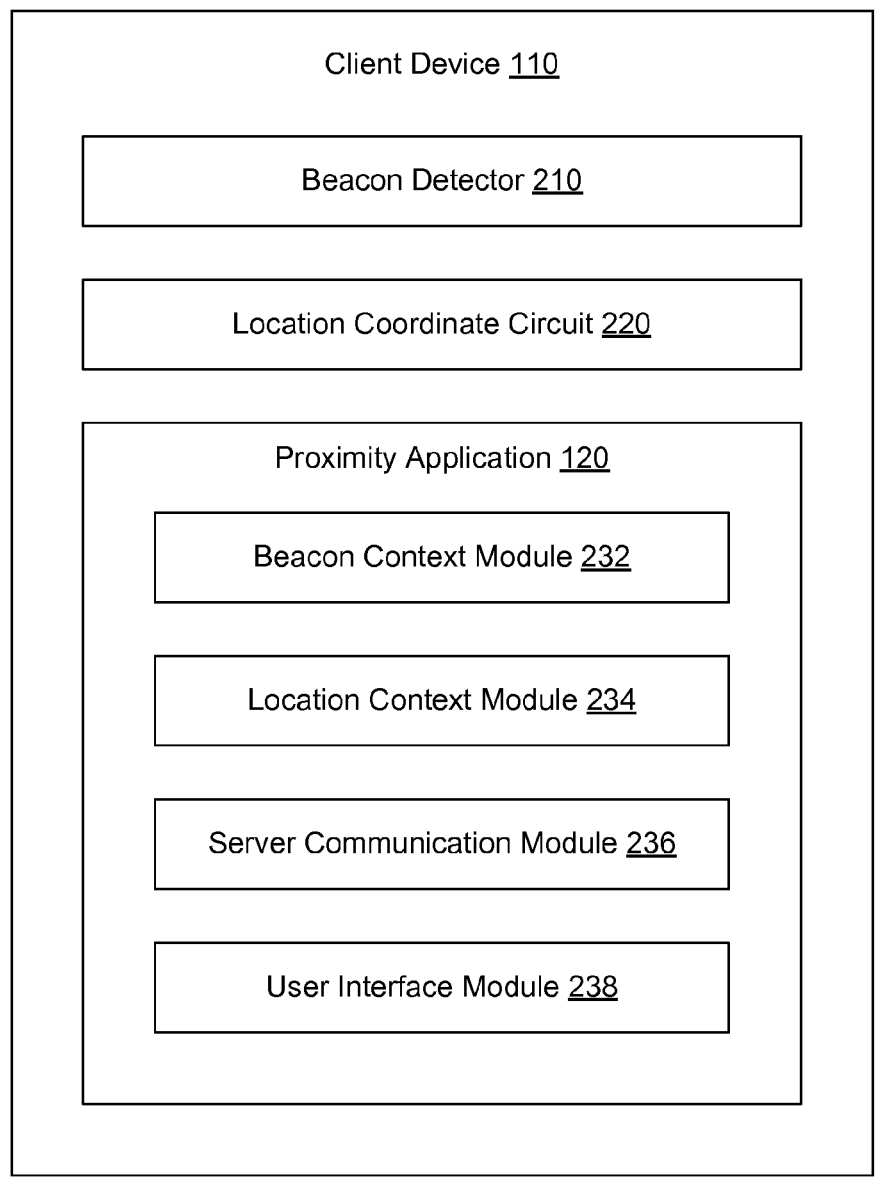
FIG. 2 is a block diagram illustrating a client device for identifying proximity history of computer devices, according to an embodiment.

FIG. 2 is a block diagram illustrating a client device 110 for identifying proximity history of computer devices, according to an embodiment. In one embodiment, client device 110 may be representative of one of client devices 110, as shown in FIG. 1. In one embodiment, client device 110 includes beacon detector 210, location coordinate circuit 220, and proximity application 120. In one embodiment, client device 110 can operate without location coordinate circuit 220. In this embodiment, the determination of proximity history of client devices 110 is achieved by comparing beacon contexts. In one embodiment, client device 110 can operate without beacon detector 210. In this embodiment, the determination of proximity history of client devices 110 is achieved by comparing location contexts. This arrangement of modules and components may be a logical separation, and in other embodiments, these modules or other components can be combined together or separated in further components, according to a particular implementation. In other embodiments, client device 110 may include different and/or additional components which are not shown to simplify the description.

In one embodiment, beacon detector 210 detects beacons that are "visible" to the client device 110. The beacons can include, for example, signals from Wi-Fi® access points or other WLAN access points, such as stationary or mobile wireless access points, Bluetooth® signals from other wireless devices, or other signals. A beacon may be "visible" to client device 110 when client device 110 is within range of the beacon and beacon detector 210 is able to detect the presence of the signal. Client device 110 need not necessarily be connected to a network associated with a beacon in order for that beacon to be "visible." Detection of the beacon is sufficient. Beacon detector 210 may also determine the signal strength of a detected beacon. In general, the stronger a detected signal beacon is, the closer the client device 110 is to the source. Alternatively, a stronger signal beacon may be indicative of a more powerful signal generator or a more cooperative signal environment. Furthermore, beacon detector 210 may also determine the type of beacon detected (e.g., stationary or mobile wireless access point, Bluetooth® signal, etc.). Depending on the embodiment, beacon detector 210 may include a mobile communications, cellular, or Bluetooth® chipset, radio, circuit, receiver, transceiver or other communications device. In one embodiment, beacon detector 210 includes any component capable of detecting the presence of a communication signal.

In one embodiment, location coordinate circuit 220 is operable to determine a location (e.g., location coordinates) of the client device 110. Location coordinate circuit 220 may determine the location in a number of ways including, for example, using the Global Positioning System (GPS), cellular triangulation using the location of known cellular network towers, Wi-Fi® triangulation using the location of known stationary Wi-Fi® access points, or other techniques. Location coordinate circuit 220 may be used to determine an actual location of client device 110, rather than just the relative proximity to one or more other client devices. Location coordinate circuit 220 may be a resource intensive component (e.g., using higher amounts of power and network bandwidth, thereby decreasing battery life in client device 110). Accordingly, rather than being always active, in some embodiments, location coordinate circuit 220 may only be activated to determine the location periodically (e.g., every 30 minutes) or in response to a specific request from the user, the server, or another application.

In one embodiment, proximity application 120 includes beacon context module 232, location context module 234, server communication module 236, and user interface module 238. In some embodiments, proximity application 120 can operate without location context module 234. In these embodiments, the determination of proximity history of client devices is achieved by comparing beacon contexts. In some embodiments, proximity application 120 can operate without beacon context module 232. In these embodiments, the determination of proximity history of client devices is achieved by comparing location contexts. This arrangement of modules and components may be a logical separation, and in other embodiments, these modules or other components can be combined together or separated in further components, according to a particular implementation.

In one embodiment, beacon context module 232 generates a beacon context indicating the beacons detected by beacon detector 210. In one embodiment, each beacon has a unique identifier. For example, the unique identifier may be a basic service set identifier (BSSID) for a Wi-Fi® beacon or a hardware device address (BD_ADDR) for a Bluetooth® beacon. In one embodiment, the beacon context includes a list, concatenation, or other format including the unique identifier of each beacon detected by beacon detector 210. In other embodiments, the beacon context additionally includes an indication of the signal strength of each detected beacon, an indication of the beacon type, a plurality of time ranges indicating when the beacon was detected, and possibly other information. In some embodiments, the size of each beacon context can also be made smaller. In one embodiment, instead of using the full beacon identifiers as part of the context, beacon context module 232 replaces each identifier with a significantly smaller hash. In one embodiment, beacon context module 232 generates a new beacon context in response to a specific request from the user, the server, or another application. In one embodiment, beacon context module 232 generates a new or updates a previous beacon context periodically or in response to a change in the beacons detected by beacon detector 210.

In some embodiments, beacon context module 232 generates a smaller context by selecting and including a subset of the detected beacons as part of the beacon context. In one embodiment, the decision of which beacons to select can be made based on an indication of strength of each detected beacon, an indication of the beacon type, a plurality of time ranges indicating when the beacon was detected, the time when the beacon visibility status was last-reported to server 130, and possibly other information. In one embodiment, beacon context module 232 limits the number of beacons in the context, so as not to exceed a certain maximum.

In some embodiments, including a subset of the detected beacons as part of the smaller beacon context may disproportionally reduce the number of beacons shared between contexts of devices in proximity. For example, if different subsets of the same set of beacons are selected, it is possible for contexts based on those subsets to have few or no beacons in common.

In some embodiments, for devices in proximity to each other, the expected number of beacons shared between contexts is increased by having all instances of the beacon context module 232 follow a deterministic beacon selection procedure based on intrinsic properties of beacons detected. In one embodiment, beacon context module 232 decides what beacons to include as part of the smaller context by using a beacon selection procedure based on beacon identifiers.

In one embodiment, beacon context module 232 generates the context from up to a certain maximum number of beacons, with preference given to beacons having identifiers that are smaller. In another embodiment, beacon context module 232 generates the context from up to a certain maximum number of beacons, with preference given to beacons having identifiers that are larger. In one embodiment, beacon context module 232 computes a hash of each beacon identifier and generates the context from up to a certain maximum number of beacons, with preference given to beacons having hashes that are smaller. In another embodiment, beacon context module 232 computes a hash of each beacon identifier and generates the context from up to a certain maximum number of beacons, with preference given to beacons having hashes that are larger. In one embodiment, the absolute value of the first 8 bytes of MURMUR3_128 hash converted to a Java long type value in little-endian order can be used, with the same MURMUR3_128 hash seed shared by all of the instances of the beacon context module. In other embodiments, some other cryptographically-secure hash function can be used.

In some embodiments, beacon context module 232 assigns each beacon a weight, and the extent of proximity between devices can be estimated as the sum of weights across beacons that the devices have in common between their respective contexts. In some embodiments, each beacon is assigned a fixed weight of one, in which case the number of beacons that the devices have in common between their respective contexts is used as the measure of proximity between the devices. In other embodiments, the weight of each beacon is computed dynamically, using information such as the type of beacon, the strength of the detected beacon signal, or a historical degree of agreement between the beacon and other beacons. In one embodiment, beacons from mobile Wi-Fi® access points are weighted higher because mobile Wi-Fi® access points typically have a weaker signal generator, such that client devices that can detect the beacon from the mobile Wi-Fi® access point are generally closer in proximity to the source of the beacon. Thus, two client devices that both detect the beacon from the same mobile Wi-Fi® access point are likely to be closer in proximity. The reverse is generally true for stationary Wi-Fi® access points, which may be weighted lower. Stationary Wi-Fi® access points typically have a more powerful signal generator, such that client devices that can detect the beacon from the stationary Wi-Fi® access point are not necessarily close in proximity to the source of the beacon or close in proximity to one another.

In one embodiment, location context module 234 generates a location context indicating a plurality of recent locations of the device (e.g., location coordinates) determined by location coordinate circuit 220. In one embodiment, the location context includes a list, concatenation, or other format including coordinates of each recent device location determined by location coordinate circuit 220. In other embodiments, the location context additionally includes an indication of the method used to determine each set of the coordinates, an indication of the reliability of each set of the coordinates, a plurality of time ranges indicating when each set of the coordinates was valid, and possibly other information. In one embodiment, location context module 234 generates a new location context in response to a specific request from the user, the server, or another application. In one embodiment, location context module 234 generates a new or updates a previous location context periodically or in response to a change in the coordinates determined by location coordinate circuit 220.

In one embodiment, server communication module 236 provides the beacon contexts generated by beacon context module 232 and the location contexts generated by location context module 234 to server 130. Server communication module 236 can send the beacon contexts and location contexts to server 130 periodically, in response to a request from server 130, or in response to a change in the beacon context or location context detected by beacon context module 232 or location context module 234, respectively.

In one embodiment, server communication module 236 may receive an indication of time intervals during which client device 110 running proximity application 120 is interpreted to be in proximity to one or more other client devices 110. The indication may include an ordered list of time intervals during which some or all of the client devices 110 are interpreted to be in proximity. In one embodiment, server 130 may determine a proximity history based on a comparison of the beacon contexts from the various client devices 110 for contexts with similar timestamps. The higher the number of beacons that are shared between two beacon contexts with similar timestamps, the closer in proximity the associated client devices 110 likely are at the time. In one embodiment, server 130 may determine proximity history based on a comparison of the location contexts from the various client devices 110 for contexts with similar timestamps. The smaller the estimate of the geographical distance between two location contexts with similar timestamps, the closer in proximity the associated client devices 110 are at the time. In one embodiment, the server 130 may determine proximity history using a combination of beacon-based and location-based methods.

In one embodiment, user interface module 238 presents a user interface (e.g., on a display of client device 110) to provide the proximity history received by server communication module 236 from server 130. In one embodiment, user interface module 238 may display the ordered list of time intervals (i.e., "events") received from server 130. For each event, user interface 238 may display the start time and the end time of the event, the subset of target client devices in proximity to the origin client device, user profile information corresponding to each of the client devices, media items associated with the event, and historical locations of each of the client devices during the event. In other embodiments, user interface 238 may display additional and/or different information.

Figure 3:
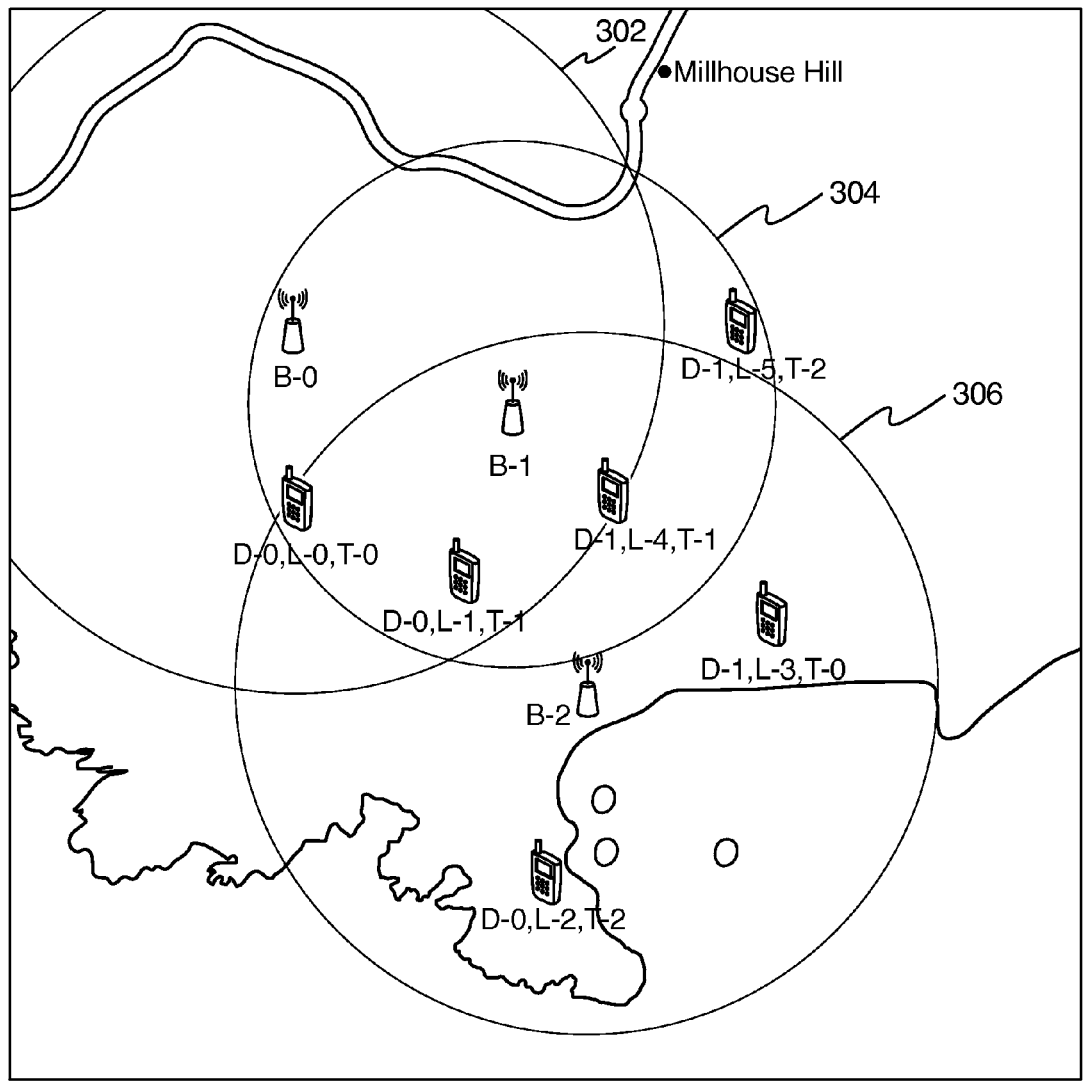
FIG. 3 is a map diagram illustrating a cluster of historical locations of client devices at different timestamps and the coverage areas of multiple beacons used to determine the proximity of the client devices, according to an embodiment.

FIG. 3 is a map diagram illustrating a cluster of historical locations of client devices at different timestamps (i.e., different moments in time) and the coverage areas of multiple beacons used to determine the proximity of the client devices, according to an embodiment. In one embodiment, the cluster 300 includes locations L-0, L-1, L-2 of client device D-0 and locations L-3, L-4, L-5 of client device D-1 at timestamps T-0, T-1, T-2 respectively. These client devices D-0, D-1 may be representative of client device 110, as shown in FIGS. 1 and 2. In the area where cluster 300 is located there are three detectable beacons B-0, B-1, B-2. Each beacon may include, for example, a stationary wireless access point, a mobile wireless access point, a Bluetooth® access point, or other signals. For illustration purposes, each beacon is assumed to be stationary, the signal reach of each beacon is assumed not to change with time, and the signal of each beacon is approximated as a circle 302, 304, 306, respectively, with the associated beacon located at the center of the circle. Each client device D-0 and D-1 is assumed to be able to detect or sense the signal from a beacon B-0, B-1, B-2 if the device is within the signal reach of that beacon at that particular moment. For example, at timestamp T-0, device D-0 is assumed to be within reach of beacons B-0, B-1, B-2 and device D-1 is assumed to be alone within reach of beacon B-2. At timestamp T-1, devices D-0 and D-1 are each assumed to be within reach of beacons B-0, B-1, B-2. At timestamp T-2, device D-0 is assumed to be alone within reach of beacon B-2, and device D-1 is assumed to be alone within reach of beacon B-1. As such, the beacon detectors 210 in each of client devices D-0 and D-1 detect the above beacons at the times specified and beacon context module 232 includes unique identifiers of the above beacons in the corresponding beacon contexts.

Figure 4:
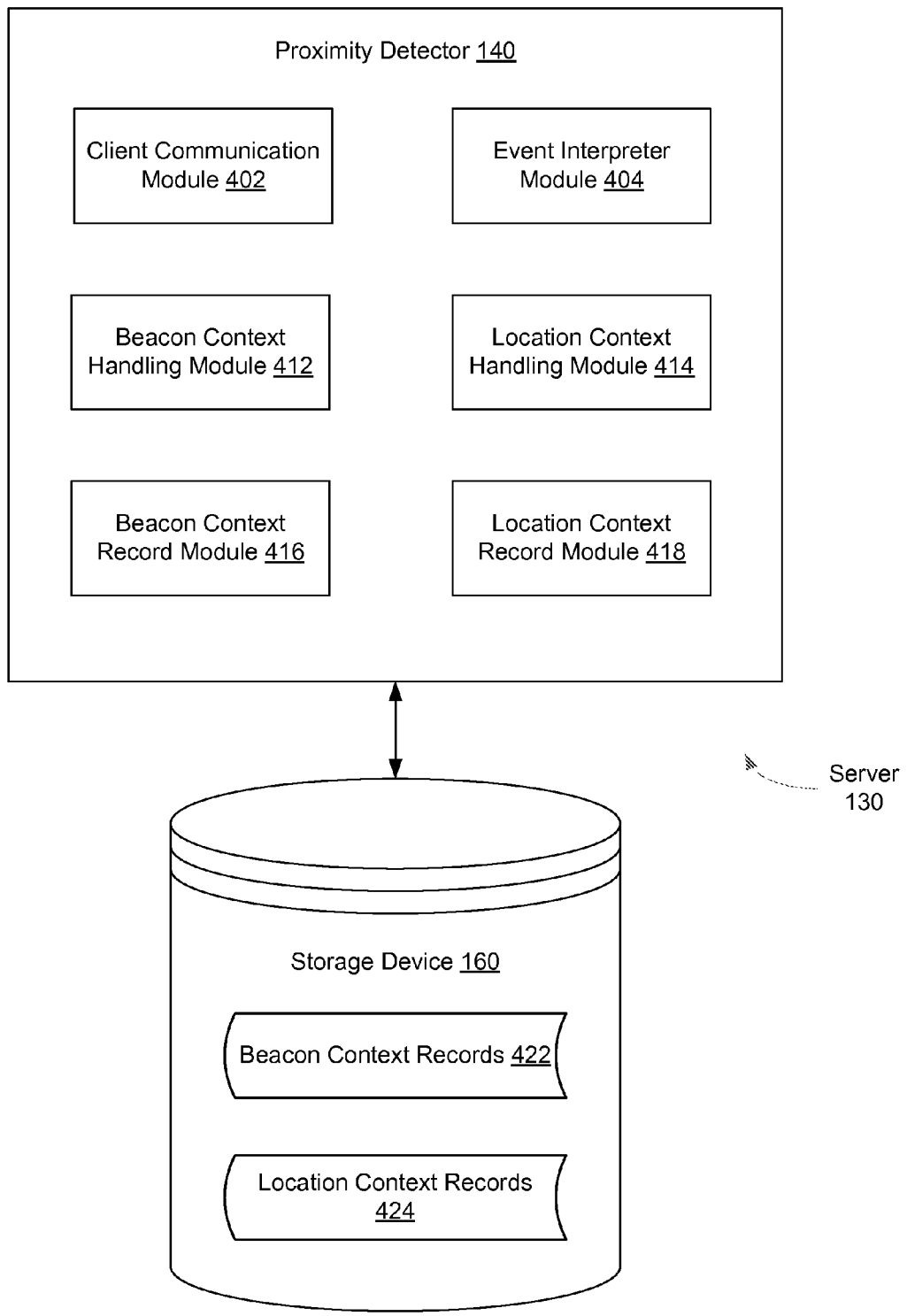
FIG. 4 is a block diagram illustrating a server-side proximity detector, according to an embodiment.

FIG. 4 is a block diagram illustrating a server-side proximity detector 140, according to an embodiment. In one embodiment, proximity detector 140 includes client communication module 402, event interpreter module 404, beacon context handling module 412, location context handling module 414, beacon context record module 416, and location context record module 418. In some embodiments, proximity detector 140 can operate without location context handling module 414 and location context record module 418. In these embodiments, the determination of the proximity history of client devices is achieved by comparing beacon contexts. In some embodiments, proximity detector can operate without beacon context handling module 412 and beacon context record module 416. In these embodiments, the determination of the proximity history of client devices is achieved by comparing location contexts. This arrangement of modules and components may be a logical separation, and in other embodiments, these modules or other components can be combined together or separated in further components, according to a particular implementation. In one embodiment, storage device 160 is connected to proximity detector 140 and includes beacon context records 422 and location context records 424. In one embodiment, server 130 may include both proximity detector 140 and storage device 160. In another embodiment, storage device 160 may be external to server 130, such as part of application server 150, and may be connected to server 130 over a network or other connection. In other implementations, server 130 may include different and/or additional components which are not shown to simplify the description. Storage device 160 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, client communication module 402 receives beacon contexts from client devices 110. Client communication module 402 may periodically request a beacon context from the client devices 110 or the client devices may send the beacon contexts according to their own schedule, such as periodically or in response to a change in the beacon context by beacon context module 232. In one embodiment, client communication module 402 receives location contexts from client devices 110. Client communication module 402 may periodically request a location context from the client devices 110 or the client devices may send the location context according to their own schedule, such as periodically or in response to a change in the location context by location context module 234. In addition, client communication module 402 may send communications to client devices 110. In one embodiment, upon proximity detector 140 determining a proximity history of one or more client devices 110, client communication module 402 may provide an indication of the proximity history to client devices 110. For example, in one embodiment, client communication module 402 generates and provides an ordered list of time intervals during which some of the client devices 110 are interpreted to be in proximity to a given client device 110 in view of a comparison of the received beacon and/or location contexts.

In one embodiment, proximity detector 140 receives the request via client communication module 402. In one embodiment, proximity detector 140 identifies a proximity history of the client device with one or more target client devices for a particular time range (i.e., the target time range). In one embodiment proximity detector 140 breaks the target time range into a number of smaller time ranges (i.e., partial time ranges), identifies proximity history for each partial time range, and identifies proximity history for the target time range by merging (e.g., concatenating) proximity history results for the partial time ranges. In one embodiment, proximity detector 140 identifies proximity histories for multiple partial time ranges in parallel. In one embodiment, for each partial time range, proximity detector 140 identifies a subset of the target client devices most relevant for the partial time range and estimates the proximity history for the partial time range using the proximity history of the client device with the target devices from the subset. In one embodiment, proximity detector 140 estimates the total time each target client device was in proximity to the origin client device during the partial time range (i.e., "presence" time) and estimates proximity history for the partial time range using proximity history of the origin client device with the target client devices most present (e.g., target devices with the most presence time).

In one embodiment, beacon context record module 416 maintains beacon context records 422 in storage device 160. Beacon context records 422 may include a database or other data store with data entries indexed by device, such as client devices 110, and possibly by beacon context timestamp. In some embodiments, one or more entities (e.g., user profiles, geographical entities, and other types of entities) can be associated with each client device, and beacon context records 422 may include a database or other data store with data entries indexed by entity and possibly by beacon context timestamp. In one embodiment, there is a separate list of data entries for each client device 110 that has communicated with proximity detector 140. In one embodiment, upon client communication module 402 receiving beacon context data from a client device 110, beacon context record module 416 determines whether a corresponding entry already exists in beacon context records 422. If a corresponding entry exists, beacon context record module 416 may update the data in the entry with the newly received data. If an entry does not already exist, beacon context record module 416 may create a new entry. In one embodiment, each entry in beacon context records 422 includes an entity identifier, a device identifier, and a copy of the beacon context received from the device. In other embodiments, each entry may include additional and/or different information.

In one embodiment, upon client communication module 402 receiving beacon context data from a client device 110, beacon context record module 416 replaces the beacon context received from the device with a smaller context generated from the first context by selecting a subset of the detected beacons before storing the smaller context in an entry in beacon context records 422. In one embodiment, the decision of what beacons to select is made based on an indication of the strength of each beacon, an indication of the beacon type, a plurality of time ranges indicating when the beacon was detected, the time when the beacon visibility status was last-reported to the server, and possibly other information. In one embodiment, beacon context record module 416 limits the number of beacons in the context not to exceed a certain maximum number of beacons.

In some embodiments, including a subset of the detected beacons as part of the smaller beacon context may disproportionally reduce the number of beacons shared between contexts of devices in proximity. For example, if different subsets of the same set of beacons are selected, it is possible for contexts based on those subsets to have few or no beacons in common.

In some embodiments, for devices in proximity, the expected number of beacons shared between contexts is increased by having beacon context record module 416 follow a deterministic beacon selection procedure based on intrinsic properties of beacons detected. In one embodiment, beacon context record module 416 decides what beacons to include as part of the smaller context in an entry in beacon context records 422 by using a beacon selection procedure based on beacon identifiers.

In one embodiment, beacon context record module 416 generates the context from up to a certain maximum number of beacons, with preference given to beacons having identifiers that are smaller. In another embodiment, beacon context record module 416 generates the context from up to a certain maximum number of beacons, with preference given to beacons having identifiers that are larger. In one embodiment, beacon context record module 416 computes a hash of each beacon identifier and generates the context from up to a certain maximum number of beacons, with preference given to beacons having hashes that are smaller. In another embodiment, beacon context record module 416 computes a hash of each beacon identifier and generates the context from up to a certain maximum number of beacons, with preference given to beacons having hashes that are larger. In one embodiment, absolute value of the first 8 bytes of MURMUR3_128 hash converted to a Java long type value in little-endian order can be used. In other embodiments, some other cryptographically-secure hash function can be used.

In some embodiments, beacon context record module 416 may obfuscate beacon data in beacon context records 422 to protect the original context data from unauthorized access or for other reasons. In one embodiment, upon client communication module 402 receiving a beacon context from client device 110, for each beacon identifier in the context, beacon context record module 416 computes a hash of the identifier (e.g., a secure one-way hash) and replaces the identifier in the context with the hash. In some embodiments, the hash function changes over time in a non-deterministic fashion to further obfuscate beacon data (e.g., hashes do not have to be universally unique or consistent).

Referring again to FIG. 4, beacon context handling module 412 makes a determination of proximity history between origin client device 110 and one or more target client devices 110 based on the beacon contexts in beacon context records 422. In one embodiment, beacon context handling module 412 receives the beacon contexts of the origin client device from beacon context record module 416. Beacon context handling module 412 also receives the beacon contexts of each of the target client devices from beacon context record module 416. For similar timestamps (e.g., timestamps close in time), beacon context handling module 412 compares beacon context records of the origin client to beacon context records of each of the target client devices. In one embodiment, beacon context handling module 412 determines a number of beacons that are shared between any two beacon contexts with similar timestamps and uses that number as a measure of proximity of the corresponding client devices 110 at that time (e.g., the higher the number of shared beacons, the closer the devices likely are to one another).

In one embodiment, beacon context handling module 412 determines a subset of the target client devices for which the beacon contexts satisfy a proximity threshold with respect to the beacon context of the origin client device. For example, the proximity threshold may specify a minimum number of beacons (e.g., two beacons, three beacons, or some other number of beacons) that should be shared between the beacon contexts in order to determine sufficient proximity. In one embodiment, for each set of similar timestamps, beacon context handling module 412 generates a list of the subset of target client devices that satisfy the proximity threshold based on the proximity of the devices to the origin client device at that time (e.g., the number of beacons shared between the beacon contexts).

In some embodiments, beacon context record module 416 may obfuscate beacon data in beacon context records 422 to protect the original context data from unauthorized access or for other reasons. In one embodiment, upon client communication module 402 receiving a beacon context from client device 110, for each beacon identifier in the context, beacon context record module 416 computes a hash of the identifier (e.g., a secure one-way hash) and replaces the identifier in the context with the hash. In some embodiments, the hash function changes over time in a non-deterministic fashion to further obfuscate beacon data (e.g., hashes do not have to be universally unique or consistent). In one embodiment, beacon context handling module 412 determines the number of hashes shared between any two beacon contexts with similar timestamps and uses that number as a measure of proximity of the corresponding client devices 110 at that time (e.g., the higher the number of shared hashes, the closer the devices likely are to one another).

Referring again to FIG. 4, in one embodiment, location context record module 418 maintains location context records 424 in storage device 160. Location context records 424 may include a database or other data store with data entries indexed by device, such as client devices 110, and possibly by location context timestamp. In some embodiments, one or more entities (e.g., user profiles, geographical entities, and other types of entities) can be associated with each client device, and location context records 424 may include a database or other data store with data entries indexed by entity and possibly location context timestamp. In one embodiment, there is a separate list of data entries for each client device 110 that has communicated with proximity detector 140. In one embodiment, upon client communication module 402 receiving location context data from a client device 110, location context record module 418 determines whether a corresponding entry already exists in location context records 424. If a corresponding entry exists, location context record module 418 may update the data in the entry with the newly received data. If an entry does not already exist, location context record module 418 may create a new entry. In one embodiment, each entry in location context records 424 includes an entity identifier, a device identifier, and a copy of the location context received from the device. In other embodiments, each entry may include additional and/or different information.

In some embodiments, location context record module 418 may obfuscate location data in location context records 424 to protect the original context data from unauthorized access or for other reasons. In one embodiment, upon client communication module 402 receiving a location context from client device 110, for each location in the context, location context record module 418 computes a plurality of location-sensitive hashes of the location (e.g., secure one-way location-sensitive hashes) and replaces the location in the context with the hashes. In some embodiments, the hash function changes over time in a non-deterministic fashion to further obfuscate location data (e.g., hashes do not have to be universally unique or consistent). In one embodiment, for each location in the context, location context record module 418 maps the location to a tile (i.e., "center" tile) on a geographical grid (e.g., Geo-hash grid, MGRS grid, or some other grid). In one embodiment, each tile has an identifier. In one embodiment, for each location in the location context, location context record module 418 replaces the location in the context with an identifier of the center tile and possibly identifiers of some or all of the tiles adjacent to the center tile. In one embodiment, tile identifiers change over time in a non-deterministic fashion to further obfuscate location data (e.g., the identifiers do not have to be universally unique or consistent).

Referring again to FIG. 4, location context handling module 414 makes a determination of proximity history between origin client device 110 and one or more target client devices 110 based on the location contexts in location context records 424. In one embodiment, location context handling module 414 receives the location context records of the origin client device from location context record module 418. Location context handling module 414 also receives the location context records of each of the target client devices from location context record module 418. For similar timestamps (e.g., timestamps close in time), location context handling module 414 compares location context records of the origin client to location context records of each of the target client devices. In one embodiment, location context handling module 414 determines an estimate of the geographical distance between any two location contexts (e.g., location coordinates) with similar timestamps and uses that estimate as a measure of proximity of the corresponding client devices 110 at that time.

In one embodiment, location context handling module 414 determines a subset of the target client devices for which the location contexts satisfy a proximity threshold with respect to the location context of the origin client device. For example, the proximity threshold may specify a maximum distance (e.g., ten meters, one hundred meters, or some other distance) that the distance estimate between the location contexts should not exceed in order to determine sufficient proximity. In one embodiment, for each set of similar timestamps, location context handling module 414 generates a list of the subset of target client devices that satisfy the proximity threshold based on the proximity of the devices to the origin client device at that time.

In some embodiments, location context record module 418 may obfuscate location data in location context records 424 to protect the original context data from unauthorized access or for other reasons. In one embodiment, upon client communication module 402 receiving a location context from client device 110, for each location in the context, location context record module 418 computes a plurality of location-sensitive hashes of the location (e.g., secure one-way location-sensitive hashes) and replaces the location in the context with the hashes. In some embodiments, the hash function changes over time in a non-deterministic fashion to further obfuscate location data (e.g., hashes do not have to be universally unique or consistent). In one embodiment, for each location in the context, location context record module 418 maps the location to a tile (i.e., "center" tile) on a geographical grid (e.g., Geo-hash grid, MGRS grid, or some other grid). In one embodiment, each tile has an identifier. In one embodiment, for each location in the location context, location context record module 418 replaces the location in the context with an identifier of the center tile and possibly identifiers of some or all of the tiles adjacent to the center tile. In one embodiment, tile identifiers change over time in a non-deterministic fashion to further obfuscate location data (e.g., the identifiers do not have to be universally unique or consistent). In one embodiment, location context handling module 414 determines the number of hashes shared between any two location contexts with similar timestamps and uses that number as a measure of proximity of the corresponding client devices 110 at that time (e.g., the higher the number of shared hashes, the closer the devices likely are to one another).

Referring again to FIG. 4, upon receiving for each set of similar timestamps a list of the target client devices that satisfy the proximity threshold with regard to the origin client device from beacon context handling module 412 and/or location context handling module 414, event interpreter 404 generates an ordered list of time intervals (i.e., "events") during which the origin client device and some or all of the target client devices are interpreted to be in proximity. In one embodiment, event interpreter 404 requires that the amount of time range of an event be no less than a certain minimum time threshold. In one embodiment, event interpreter 404 requires that the amount of time range of an event not exceed a certain maximum time threshold.

In one embodiment, a target client device is considered to be in proximity to the origin client device over a continuous time range when: the time range starts at a timestamp when the target client device is in proximity to the origin client device; the time range ends at a timestamp when the target client device is in proximity to the origin client device; and the time difference between any two consecutive timestamps when the target client device is in proximity to the origin client device does not exceed a certain maximum threshold.

In one embodiment, event interpreter 404 includes a target client device as part of an event if the time difference between any two consecutive event timestamps (i.e., timestamps within the event) when the target client device is in proximity to the origin client device does not exceed a certain maximum threshold. In one embodiment, event interpreter 404 includes a target client device as part of an event if the total time when the target client device is in proximity to the origin client device is no less than a certain minimum time threshold (or a certain minimum time ratio threshold) during the event time range (e.g., 50%, 80%, 100%, or some other percentage of the amount of the event time range). In one embodiment, event interpreter 404 requires that for each target client device in proximity to the origin client device for more than a certain minimum time threshold (or a certain minimum time ratio threshold) during the event time range, the time difference between any two consecutive event timestamps (i.e., timestamps within the event) when the target client device is in proximity to the origin client device does not exceed a certain maximum threshold. In one embodiment, event interpreter 404 requires that for each target client device in proximity to the origin client device for more than a certain minimum time threshold (or a certain minimum time ratio threshold) during the event time range, the total time when the target client device is in proximity to the origin client device be no less than a certain minimum time threshold (or a certain minimum time ratio threshold) during the event time range (e.g., 50%, 80%, 100%, or some other percentage of the amount of the event time). In one embodiment, upon generating an ordered list of events, event interpreter 404 provides the list to client communication module 402, which provides the list to the origin client device.

Figure 5:
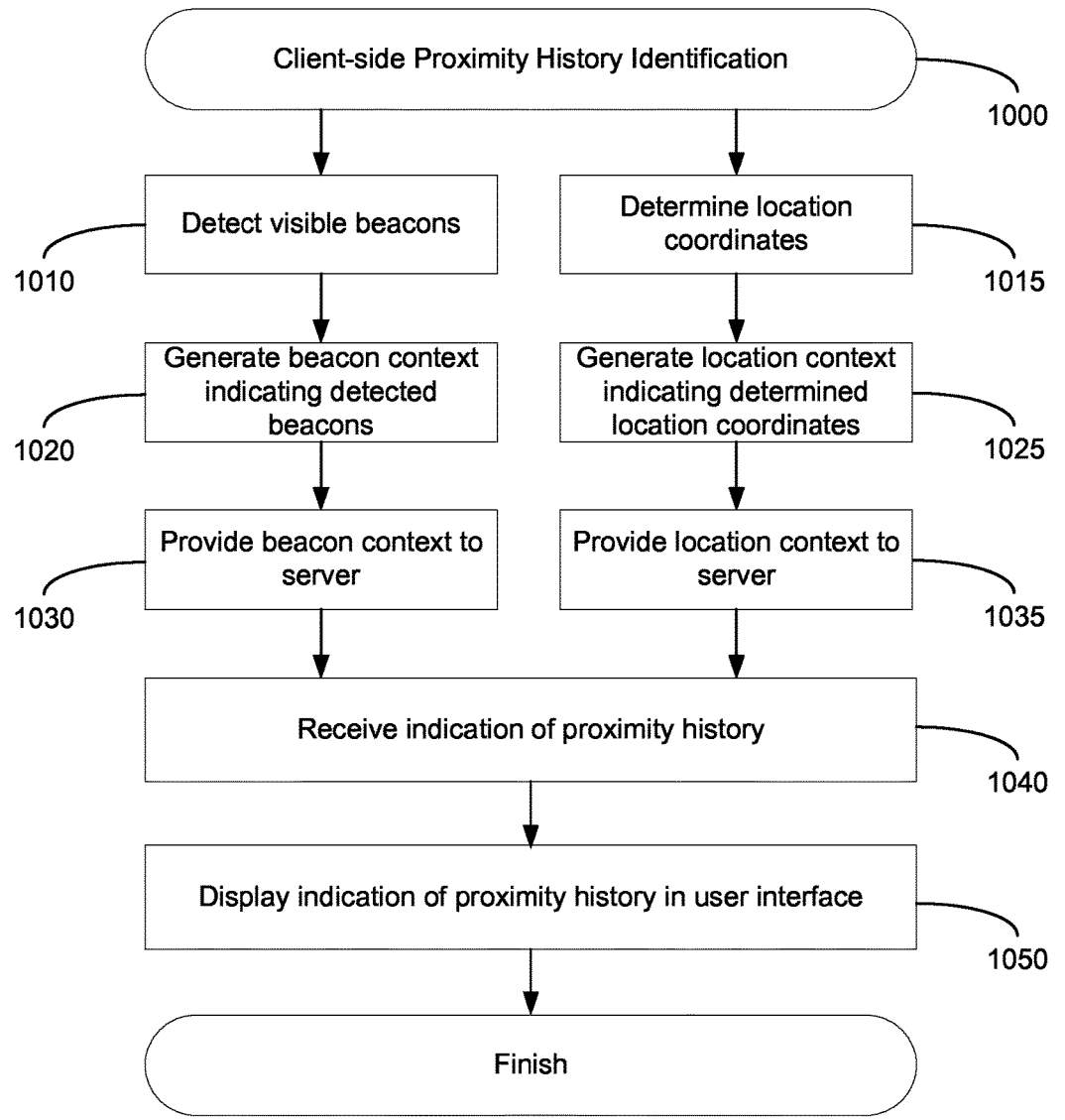
FIG. 5 is a flow diagram illustrating method for client-side proximity history identification, according to an embodiment.

FIG. 5 is a flow diagram illustrating method for client-side proximity history identification, according to an embodiment. The method 1000 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to generate a beacon context based on the detected signal beacons and/or a location context based on the determined location coordinates, provide the context data to the server, and receive an indication of the device proximity history with one or more other client devices, determined in view of the historical context data. In one embodiment, method 1000 may be performed by client device 110, as shown in FIGS. 1 and 2.

Referring to FIG. 5, at block 1010, method 1000 detects a plurality of visible beacons. In one embodiment, beacon detector 210 detects beacons that are "visible" to the client device 110. The beacons can include, for example, signals from Wi-Fi® access points, such as stationary or mobile wireless access points, Bluetooth® signals from other wireless devices, or other signals. A beacon may be "visible" to client device 110 when client device 110 is within range of the beacon and beacon detector 210 is able to detect the presence of the signal. Beacon detector 210 may also determine the signal strength of a detected beacon and the type of beacon detected (e.g., stationary or mobile wireless access point, Bluetooth® signal, etc.).

At block 1015, method 1000 determines location (e.g., location coordinates) of client device 110. In one embodiment, location coordinate circuit 220 determines the location. Location coordinate circuit 220 may determine the location in a number of ways including, for example, using the Global Positioning System (GPS), cellular triangulation using the location of known cellular network towers, Wi-Fi® triangulation using the location of known stationary Wi-Fi® access points, or other techniques.

At block 1020, method 1000 generates a beacon context indicating the plurality of beacons detected at block 1010. In one embodiment, beacon context module 232 generates a beacon context indicating the beacons detected by beacon detector 210. In one embodiment, each beacon has a unique identifier. In one embodiment, the beacon context includes a list, concatenation, or other format including the unique identifier of each beacon detected by beacon detector 210. In other embodiments, the beacon context additionally includes an indication of the signal strength of each detected beacon, an indication of the beacon type, a plurality of time ranges indicating when the beacon was detected, and possibly other information. In one embodiment, beacon context module 232 generates a new beacon context in response to a specific request from the user, the server, or another application. In one embodiment, beacon context module 232 generates a new or updates a previous beacon context periodically or in response to a change in the beacons detected by beacon detector 210.

At block 1025, method 1000 generates a location context indicating a plurality of recent locations of the device determined at block 1015. In one embodiment, location context module 234 generates the location context indicating a plurality of recent locations of the device determined by location coordinate circuit 220. In one embodiment, the location context includes a list, concatenation, or other format including coordinates of each recent device location determined by location coordinate circuit 220. In other embodiments, the location context additionally includes an indication of the method used to determine each set of the coordinates, an indication of the reliability of each set of the coordinates, a plurality of time ranges indicating when each set of the coordinates was valid, and possibly other information. In one embodiment, location context module 234 generates a new location context in response to a specific request from the user, the server, or another application. In one embodiment, location context module 234 generates a new or updates a previous location context periodically or in response to a change in the coordinates determined by location coordinate circuit 220.

At block 1030, method 1000 provides the beacon context to a server. In one embodiment, server communication module 236 provides the beacon contexts generated by beacon context module 232 to server 130. Server communication module 236 may send the beacon context to server 130 periodically, in response to a request from server 130, or in response to a change in the beacon context by beacon context module 232.

At block 1035, method 1000 provides the location context to a server. In one embodiment, server communication module 236 provides the location contexts generated by location context module 234 to server 130. Server communication module 236 may send the location context to server 130 periodically, in response to a request from server 130, or in response to a change in the location context by location context module 234.

At block 1040, method 1000 receives, from the server, an indication of proximity history of origin client device 110 with one or more other target client devices 110. In one embodiment, server communication module 236 may receive an indication of time intervals during which origin client device 110 is interpreted to be in proximity to one or more other target client devices 110. The indication may include an ordered list of time intervals (i.e., "events")

during which some or all of the client devices 110 are interpreted to be in proximity. In one embodiment, server 130 may determine proximity history based on a comparison of the beacon contexts from the various client devices 110 for contexts with similar timestamps. The higher the number of beacons that are shared between two beacon contexts with similar timestamps, the closer in proximity the associated client devices 110 are at the time. In one embodiment, server 130 may determine proximity history based on a comparison of the location contexts from the various client devices 110 for contexts with similar timestamp. The smaller the estimate of the geographical distance between two location contexts with similar timestamps, the closer in proximity the associated client devices 110 are at the time. In one embodiment, the server 130 may determine proximity history using a combination of beacon- and location-based methods.

At block 1050, method 1000 displays an indication of the proximity history of the origin device in user interface. In one embodiment, user interface module 238 presents a user interface (e.g., on a display of client device 110) to provide the proximity history received by server communication module 236 from server 130. In one embodiment, user interface module 238 may display the ordered list of time intervals (i.e., "events") received from server 130. For each event, user interface 238 may display the start time and the end time of the event, target client devices in proximity to the origin client device, user profile information corresponding to each of the client devices, media items associated with the event, and historical locations of each of the client devices during the event. In other embodiments, user interface 238 may display additional and/or different information.

Figure 6:
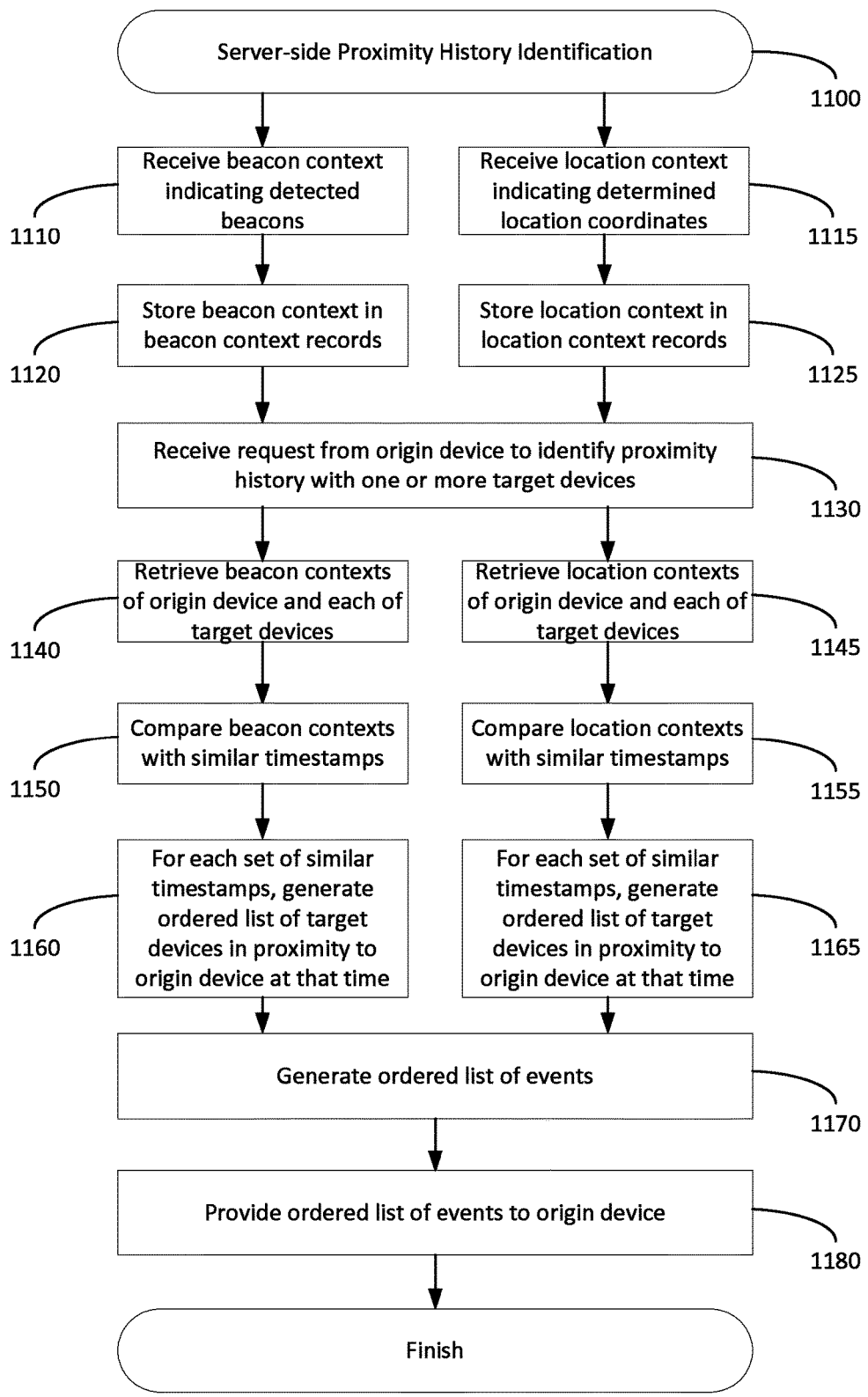
FIG. 6 is a flow diagram illustrating method for server-side proximity history identification, according to an embodiment.

FIG. 6 is a flow diagram illustrating method for server-side proximity history identification, according to an embodiment. The method 1100 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to receive beacon and/or location contexts from client devices and, upon a request from a client device, determine proximity history of the client device with one or more other client devices in view of the received historical beacon and/or location contexts. In one embodiment, method 1100 may be performed by proximity detector 140, as shown in FIGS. 1 and 4.

Referring to FIG. 6, at block 1110, method 1100 receives a beacon context from a client device indicating a plurality of beacons detected by the client device. In one embodiment, client communication module 402 receives beacon contexts from client devices 110. Client communication module 402 may periodically request a beacon context from the client devices 110 or the client devices may send the beacon contexts according to their own schedule, such as periodically or in response to a change in the beacon context by beacon context module 232.

At block 1115, method 1100 receives a location context from a client device indicating a plurality of recent locations of the client device. In one embodiment, client communication module 402 receives location contexts from client devices 110. Client communication module 402 may periodically request a location context from the client devices 110 or the client devices may send the location context according to their own schedule, such as periodically or in response to a change in the location context by location context module 234.

At block 1120, method 1100 stores the received beacon context in a beacon context record 422. In one embodiment, beacon context record module 416 maintains beacon context records 422 in storage device 160. Beacon context records 422 may include a database or other data store with data entries indexed by device, such as client devices 110, and possibly beacon context timestamp. In some embodiments, one or more entities (e.g., user profiles, geographical entities, and other types of entities) can be associated with each client device, and beacon context records may include a database or other data store with data entries indexed by entity and possibly beacon context timestamp. In one embodiment, there is a separate list of data entries for each client device 110 that has communicated with proximity detector 140.

At block 1125, method 1100 stores the received location context in a location context record 424. In one embodiment, location context record module 418 maintains location context records 424 in storage device 160. Location context records 424 may include a database or other data store with data entries indexed by device, such as client devices 110, and possibly location context timestamp. In some embodiments, one or more entities (e.g., user profiles, geographical entities, and other types of entities) can be associated with each client device, and location context records may include a database or other data store with data entries indexed by entity and possibly location context timestamp. In one embodiment, there is a separate list of data entries for each client device 110 that has communicated with proximity detector 140.

At block 1130, method 1100 receives a request from an origin client device to identify proximity history of the client device with one or more target client devices. In one embodiment, proximity detector 140 receives the request via client communication module 402. In one embodiment, proximity detector 140 identifies proximity history of the client device with one or more target client devices for a particular time range (i.e., the target time range). In one embodiment proximity detector 140 breaks the target time range into a number of smaller time ranges (i.e., partial time ranges), identifies proximity history for each partial time range, and identifies proximity history for the target time range by merging (e.g., concatenating) proximity history results for the partial time ranges. In one embodiment, proximity detector 140 identifies proximity histories for multiple partial time ranges in parallel. In one embodiment, for each partial time range, proximity detector 140 identifies a subset of the target client devices most relevant for the partial time range and estimates the proximity history for the partial time range using proximity history of the client device with the target devices from the subset. In one embodiment, proximity detector 140 estimates the total time each target client device was in proximity to the origin client device during the partial time range (i.e., "presence" time) and estimates proximity history for the partial time range using proximity history of the origin client device with the target client devices most present (e.g., target devices with the most presence time).

At block 1140, method 1100 retrieves historical beacon context records of the origin client device and each of the target client devices. In one embodiment, beacon context record module 416 retrieves historical beacon context records of the origin client device and each of the target client devices from beacon context records 422 and provides the beacon context records to beacon context handling module 412.

At block 1145, method 1100 retrieves historical location context records of the origin client device and each of the target client devices. In one embodiment, location context record module 418 retrieves historical location context records of the origin client device and each of the target client devices from location context records 424 and provides the location context records to location context handling module 414.

At block 1150, method 1100 makes a determination of proximity history between origin client device 110 and one or more target client devices 110. In one embodiment, beacon context handling module 412 receives the beacon context records of the origin client device from beacon context record module 416. Beacon context handling module 412 also receives the beacon context records of each of the target client devices from beacon context record module 416. For similar timestamps (e.g., timestamps close in time), beacon context handling module 412 compares beacon context records of the origin client to beacon context records of each of the target client devices. In one embodiment, beacon context handling module 412 determines a number of beacons that are shared between any two beacon contexts with similar timestamps and uses that number as a measure of proximity of the corresponding client devices 110 at that time (e.g., the higher the number of shared beacons, the closer the devices likely are to one another). In one embodiment, beacon context handling module 412 determines a subset of the target client devices for which the beacon contexts satisfy a proximity threshold with respect to the beacon context of the origin client device. For example, the proximity threshold may specify a minimum number of beacons (e.g., two beacons, three beacons, or some other number of beacons) that should be shared between the beacon contexts in order to determine sufficient proximity.

At block 1155, method 1100 makes a determination of proximity history between origin client device 110 and one or more target client devices. In one embodiment, location context handling module 414 receives the location context records of the origin client device from location context record module 418. Location context handling module 414 also receives the location context records of each of the target client devices from location context record module 418. For similar timestamps (e.g., timestamps close in time), location context handling module 414 compares location context records of the origin client to location context records of each of the target client devices. In one embodiment, location context handling module 414 determines an estimate of the geographical distance between any two location contexts with similar timestamps and uses that estimate as a measure of proximity of the corresponding client devices 110 at that time. In one embodiment, location context handling module 414 determines a subset of the target client devices for which the location contexts satisfy a proximity threshold with respect to the location context of the origin client device. For example, the proximity threshold may specify a maximum distance (e.g., ten meters, one hundred meters, or some other distance) that the distance estimate between the location contexts should not exceed in order to determine sufficient proximity.

At block 1160, method 1100, for each set of similar timestamps, generates a list of the subset of target client devices that satisfy the proximity threshold based on the proximity of the devices to the origin client device at that time. In one embodiment, for each set of similar timestamps, beacon context handling module 412 generates a list of the subset of target client devices that satisfy the proximity threshold based on the proximity of the devices to the origin client device at that time (e.g., the number of beacons shared between the beacon contexts).

At block 1165, method 1100, for each set of similar timestamps, generates a list of the subset of target client devices that satisfy the proximity threshold based on the proximity of the devices to the origin client device at that time. In one embodiment, for each set of similar timestamps, location context handling module 414 generates a list of the subset of target client devices that satisfy the proximity threshold based on the proximity of the devices to the origin client device at that time.

At block 1170, method 1100 generates an ordered list of time intervals (i.e., "events") during which the origin client device and some or all of the target client devices are interpreted to be in proximity. In one embodiment, event interpreter 404 generates an ordered list of events during which the origin client device and some or all of the target client devices are interpreted to be in proximity. In one embodiment, event interpreter 404 requires that the amount of the time range of an event be no less than a certain minimum time threshold. In one embodiment, event interpreter 404 requires that the amount of the time range of an event not exceed a certain maximum time threshold.

In one embodiment, a target client device is considered to be in proximity to the origin client device over a continuous time range when: the time range starts at a timestamp when the target client device is in proximity to the origin client device; the time range ends at a timestamp when the target client device is in proximity to the origin client device; and the time difference between any two consecutive timestamps when the target client device is in proximity to the origin client device does not exceed a certain maximum threshold.

In one embodiment, event interpreter 404 includes a target client device as part of an event if the time difference between any two consecutive event timestamps (i.e., timestamps within the event) when the target client device is in proximity to the origin client device does not exceed a certain maximum threshold. In one embodiment, event interpreter 404 includes a target client device as part of an event if the total time when the target client device is in proximity to the origin client device is no less than a certain minimum time threshold (or a certain minimum time ratio threshold) during the event time range (e.g., 50%, 80%, 100%, or some other percentage of the amount of the event time range). In one embodiment, event interpreter 404 requires that for each target client device in proximity to the origin client device for more than a certain minimum time threshold (or a certain minimum time ratio threshold) during the event time range, the time difference between any two consecutive event timestamps (i.e., timestamps within the event) when the target client device is in proximity to the origin client device does not exceed a certain maximum time threshold. In one embodiment, event interpreter 404 requires that for each target client device in proximity to the origin client device for more than a certain minimum time threshold (or a certain minimum time ratio threshold) during the event time range, the total time when the target client device is in proximity to the origin client device be no less than a certain minimum time threshold (or a certain minimum time ratio threshold) during the event time range (e.g., 50%, 80%, 100%, or some other percentage of the amount of the event time range).

In one embodiment, event interpreter 404 generates an ordered list of events during which the origin client device and some or all of the target client devices are interpreted to be in proximity (i.e., interpreted to be "present"). In one embodiment, a set of media (e.g., a photo, a video, or some other media) is associated with each client device. In one embodiment, for each media item, the time when the media item was acquired (e.g., the time that the photo or video was captured by the client device, media timestamp) is determined. In one embodiment, the time when the media item was acquired is determined by examining metadata stored as part of the media item (e.g., image EXIF metadata). In one embodiment, the time when the media item was acquired is retrieved from the file system where the media item is stored or from an auxiliary metadata store (e.g., media store provider on Android™). In one embodiment, media items acquired during an event and originating from a client device present as part of the event are associated with the event and vice versa. In one embodiment, each media item associated with an event is associated with a subset of client devices and users (e.g., through the use of user profiles) present as part of the event. In one embodiment, each media item associated with an event is associated with a subset of client devices and users (e.g., through the use of user profiles) present when the media item was acquired.

In one embodiment, event interpreter 404 generates an ordered list of events during which the origin client device and some or all of the target client devices are interpreted to be in proximity. In one embodiment, event interpreter 404 requires that each event start at a timestamp of interest and end at a timestamp of interest. In one embodiment, event interpreter 404 requires that each event start with an event media timestamp and end with an event media timestamp (e.g., the time that a photo or video was captured by a client device).

In various embodiments related to generating the ordered list of events at block 1170, for each time range that may constitute an event, event interpreter 404 may compute a numerical estimate (i.e., an event score) of the probability that the time range is perceived as an event (e.g., a time range with a higher score is more likely to be perceived as an event). Furthermore, event interpreter 404 may generate an ordered list of events such that the total event score (e.g., the sum of individual event scores) is maximized. Event interpreter 404 may additionally or alternatively employ dynamic programming and/or apply other optimization techniques to generate an ordered list of events such as to maximize the total event score.

In one embodiment, for each time range that may constitute an event and for each target client device in proximity to the origin client device for more than a certain minimum time threshold (or a certain minimum time ratio threshold) during the time range, event interpreter 404 may compute the cumulative presence time, i.e., the total time when the target client device is in proximity to the origin client device during the time range. Furthermore, event interpreter 404 may compute the minimum cumulative presence time across all the participating target client devices (e.g., a smallest total time when a participating target client device is in proximity to the origin client device during the time range).

In one embodiment, for each time range that may constitute an event, when the minimum cumulative presence time is less than a certain minimum time threshold (or a certain minimum time ratio threshold) during the time range (e.g., 50%, 80%, 100%, or some other percentage of the amount of the time range), event interpreter 404 may not consider the time range to be an event.

In one embodiment, for each time range that may constitute an event, when the minimum cumulative presence time is no less than a certain minimum time threshold (or a certain minimum time ratio threshold) during the time range (e.g., 50%, 80%, 100%, or some other percentage of the amount of the time range), event interpreter 404 may compute the minimum cumulative presence time ratio, i.e., the minimum cumulative presence time divided by the time difference between the timestamps. Furthermore, event interpreter 404 may compute an event score for the time range as the square of the product of: the minimum cumulative presence time ratio; and the number of media items originating from the origin client device and a subset of the target client devices in proximity to the origin client device during the time range.

At block 1180, method 1100 provides an indication of the proximity history of origin client device 110 with one or more target client devices 110 to the origin client device. In one embodiment, client communication module 402 may provide the ordered list of events during which the origin client device and some or all of the target client devices are interpreted to be in proximity to the origin client device. In one embodiment, for each event, client communication module 402 may provide the start time and the end time of the event, the subset of target client devices in proximity to the origin client device, user profile information corresponding to each of the client devices, media items associated with the event, and historical locations of each of the client devices during the event. In other embodiments, client communication module may provide additional and/or different information.

In some embodiments, proximity history of origin client device 110 with one or more target client devices 110 is used to facilitate sharing. In one embodiment, media items associated with the same event can be shared individually or in bulk with a plurality of users present at the event, either automatically or upon a confirmation from a user (e.g., the original owner of the media).

In some embodiments, a user is notified when they have any media items to share with other users who were in proximity to the user when the media item was acquired. In some embodiments, a user is notified when other users have any media item that the user may be interested in (e.g., because the user's device was present at the same location when the media in question was acquired). In one embodiment, upon a notification that one or more other users have media items that the user may be interested in, a system is provided for the user to request some or all of the media items in question to be shared with the user. For example, in one embodiment, a user is notified when another user with a confirmed relationship to the first user (e.g., their connection on a social media network) takes a photo when in proximity to the first user. Upon receiving the notification, the first user may use information in the notification to request the photo from the second user. The second user may then choose to share the photo with the first user.

In some embodiments, a user is notified when they have any media items to share with other users present as part of the event when the media items were acquired. In some embodiments, a user is notified when other users have any media items that the user may be interested in (e.g., because the user was present as part of the event when the media in question was acquired). In one embodiment, upon a notification that one or more other users have media items that the user may be interested in, a system is provided for the user to request some or all of the media items in question to be shared with the user. For example, in one embodiment, a user is notified when another user with a confirmed relationship to the first user (e.g., their connection on a social media network) takes a number of photos as part of an event with both users present. Upon receiving the notification, the first user may use information in the notification to request the photos from the second user. The second user may then choose to share the photos with the first user.

In some embodiments, a user is notified when they have any media items to share with other users present as part of the event when the media items were acquired. In some embodiments, a user is notified when other users have any media items that the user may be interested in (e.g., because the user was present as part of the event when the media item in question was acquired). In one embodiment, a user is notified no earlier than a certain time threshold after the completion time of the event. In one embodiment, a user is notified no later than a certain time threshold after the completion time of the event. In one embodiment, a user is notified no earlier than a certain time threshold after the last media item associated with the event was acquired. In one embodiment, a user is notified no later than a certain time threshold after the last media item associated with the event was acquired.

In one embodiment, instead of storing historical context information on the server 130 as indicated at blocks 1120 and 1125, each client device 110 may use context information (e.g., either beacon context or location context) at the time to find other client devices 110 in proximity and to store an indication of those other devices instead. In this embodiment, no raw context information may be stored, but only proximity results at the time of the request are stored. For example, periodically (e.g., every minute or so), the client device 110 may search for other clients nearby (e.g., using beacon or location context information) and store the results on the server. Once this information is stored, the rest of the functionality described above with respect to event generation, organization and processing of media items, annotation and sharing of media items, etc. can be implemented the same way.

Storing information about every client device in proximity to the origin device every minute or so may not scale well if there is a high density of client devices in the area (e.g., and urban center, sporting event, etc.). Accordingly, in one embodiment, proximity detector 140 may store information only about a subset of the client devices in proximity (e.g., "interesting" clients). For example, proximity detector 140 may store information only about client devices that are associated with a user having a confirmed relationship to the user of the origin device (e.g., their connection on a social media network, presence in a contacts list, etc.).

Figure 7:
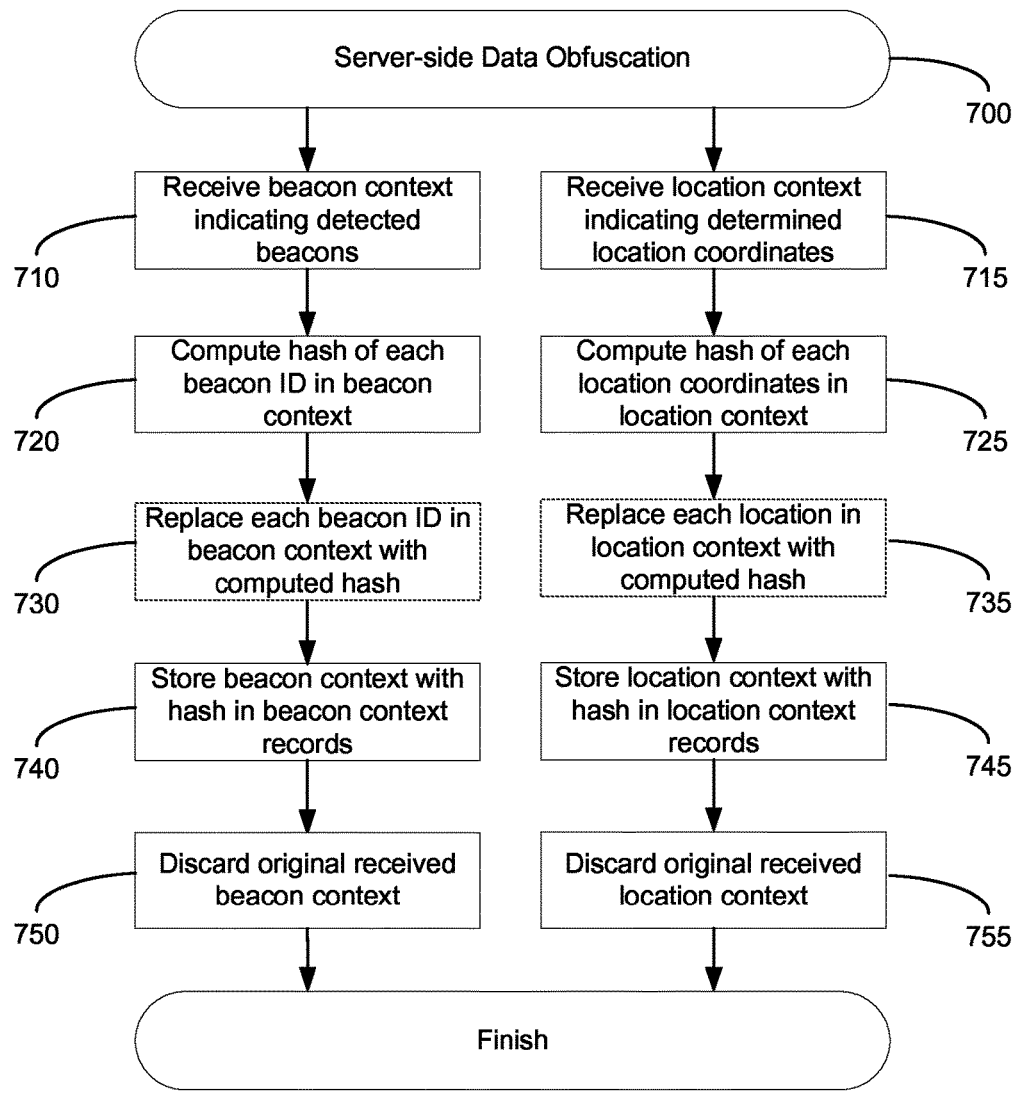
FIG. 7 is a flow diagram illustrating a server-side data obfuscation method, according to an embodiment.

FIG. 7 is a flow diagram illustrating a server-side data obfuscation method, according to an embodiment. The method 700 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to receive beacon and/or location contexts from client devices and obfuscate the context data to protect the original context data from unauthorized access. In one embodiment, method 700 may be performed by proximity detector 140, as shown in FIGS. 1 and 4.

Referring to FIG. 7, at block 710, method 700 receives a beacon context from a client device indicating a plurality of beacons detected by the client device. At block 715, method 700 receives a location context from a client device indicating a plurality of recent locations of the client device. In one embodiment, client communication module 402 receives beacon contexts or location contexts from client devices 110. Client communication module 402 may periodically request a beacon context or location context from the client devices 110 or the client devices may send the beacon contexts or location contexts according to their own schedule, such as periodically or in response to a change in the beacon context or location context.

At block 720, method 700 computes a hash of each beacon identifier in the received beacon context to obfuscate beacon data in beacon context records 422 and protect the original context data from unauthorized access or for other reasons. In one embodiment, for each beacon identifier in the context, beacon context record module 416 computes a hash of the identifier (e.g., a secure one-way hash) and, at block 730, replaces the identifier in the context with the hash. In some embodiments, the hash function changes over time in a non-deterministic fashion to further obfuscate beacon data (e.g., hashes do not have to be universally unique or consistent).

At block 725, method 700 computes a hash of each location in the received location context to obfuscate location data in location context records 424 and protect the original context data from unauthorized access or for other reasons. In one embodiment, for each location in the context, location context record module 418 computes a plurality of location-sensitive hashes of the location (e.g., secure one-way location-sensitive hashes) and, at block 735, replaces the location in the context with the hashes. In some embodiments, the hash function changes over time in a non-deterministic fashion to further obfuscate location data (e.g., hashes do not have to be universally unique or consistent). In one embodiment, for each location in the context, location context record module 418 maps the location to a tile (i.e., "center" tile) on a geographical grid (e.g., Geo-hash grid, MGRS grid, or some other grid). In one embodiment, each tile has an identifier. In one embodiment, for each location in the location context, location context record module 418 replaces the location in the context with an identifier of the center tile and possibly identifiers of some or all of the tiles adjacent to the center tile. In one embodiment, tile identifiers change over time in a non-deterministic fashion to further obfuscate location data (e.g., the identifiers do not have to be universally unique or consistent).

At block 740, method 700 stores the beacon context with the hashes in a beacon context record 422. At block 745, method 700 stores the location context with the hashes in a location context record 424. In one embodiment, beacon context record module 416 maintains beacon context records 422 in storage device 160 and location context record module 418 maintains location context records 424. Beacon context records 422 and location context records 424 may include a database or other data store with data entries indexed by device, such as client devices 110, and possibly beacon context timestamp. In some embodiments, one or more entities (e.g., user profiles, geographical entities, and other types of entities) can be associated with each client device, and beacon context records and location context records may include a database or other data store with data entries indexed by entity and possibly beacon context timestamp. In one embodiment, there is a separate list of data entries for each client device 110 that has communicated with proximity detector 140.

At block 750, method 700 discards the original received beacon context without storing the beacon context in beacon context records 422. At block 755, method 700 discards the original received location context without storing the location context in location context records 424.

Figure 8:
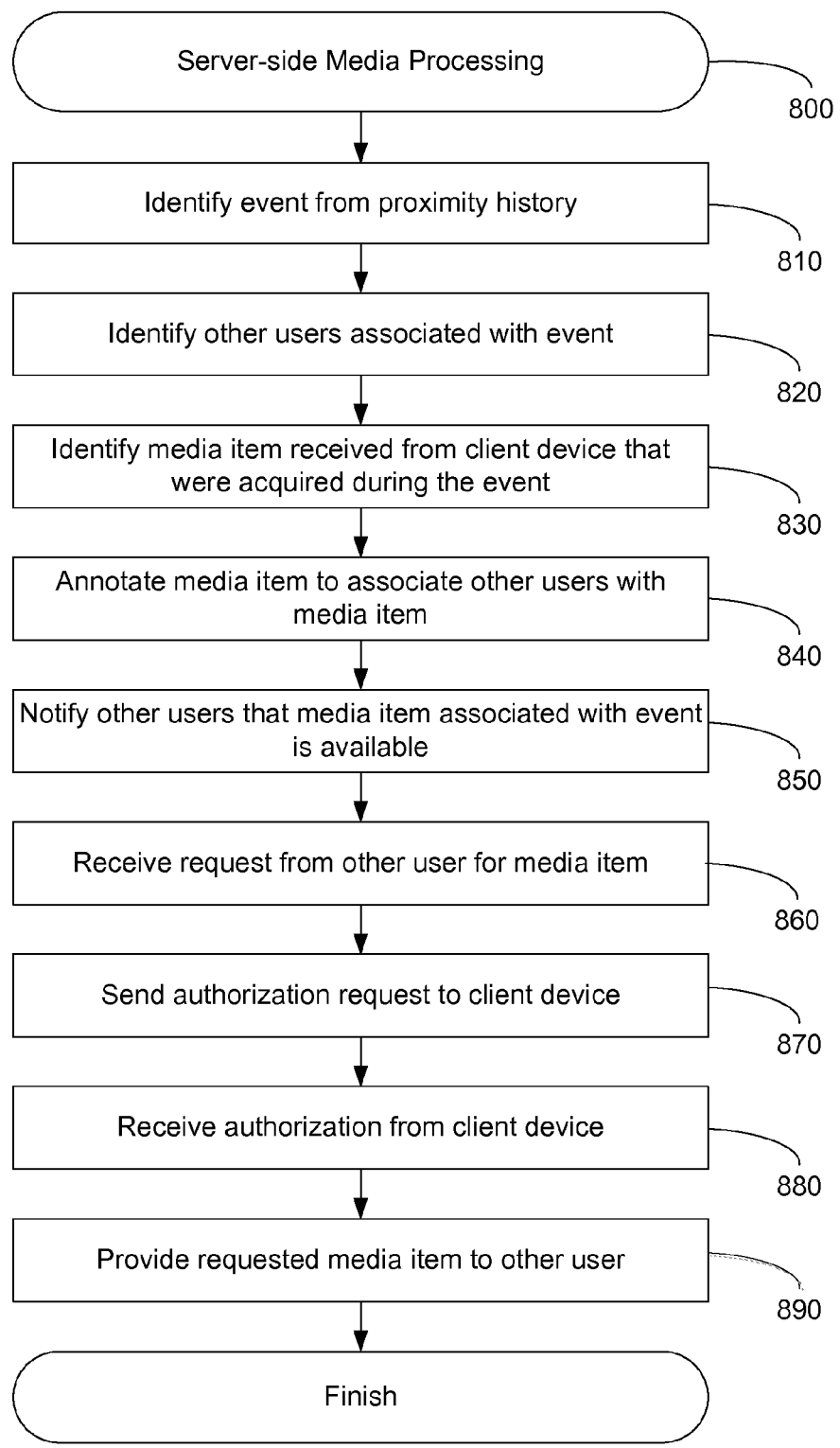
FIG. 8 is a flow diagram illustrating a server-side media processing method, according to an embodiment.

FIG. 8 is a flow diagram illustrating a server-side media processing method, according to an embodiment. The method 800 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to annotate media items based on identified events and enable sharing of those media items among user's associated with the events. In one embodiment, method 800 may be performed by proximity detector 140, as shown in FIGS. 1 and 4.

Referring to FIG. 8, at block 810, method 800 identifies an event from the proximity history. In one embodiment, event interpreter 404 generates an ordered list of events during which the origin client device and some or all of the target client devices are interpreted to be in proximity, as described above. At block 820, method 800 identifies other users associated with the event. For example, using user profile information corresponding to each of the target client devices that were present for the event, event interpreter 404 can identify the other users.

At block 830, method 800 identifies one or more media items received from the client device 110 that were acquired during the event. In one embodiment, media items (e.g., a photo, a video, or some other media) acquired during an event and originating from a client device present as part of the event are associated with the event and vice versa. At block 840, method 800 annotates the media item(s) to associate the other users with the media item(s). In one embodiment, each media item associated with an event is associated with a subset of client devices and users (e.g., through the use of user profiles) present as part of the event. In one embodiment, each media item associated with an event is associated with a subset of client devices and users (e.g., through the use of user profiles) present when the media item was acquired Annotation may include adding an identifier of each of the subset of client devices or user profiles to metadata associated with the media item. This may result in the media item being indexed and/or searchable using the identifier of the client device or user profile.

At block 850, method 800 notifies the other users that the media item(s) associated with the event are available. In some embodiments, the other users are notified when media item are available that they may be interested in (e.g., because the user's device was present at the same location when the media in question was acquired). The notification may be in the form of an email, SMS message, push notification, etc. For example, in one embodiment, a user is notified when another user with a confirmed relationship to the first user (e.g., their connection on a social media network) takes a photo when in proximity to the first user.

At block 860, method 800 receives a request for the media item from at least one of the other users. In one embodiment, upon a notification that one or more other users have media items that the user may be interested in, a system is provided for the user to request some or all of the media items in question to be shared with the user. At block 870, method 800 sends a request for authorization to share the media item to the client device 110 from which the media item was received. At block 880, method 800 receives authorization to share the media item with the other users. At block 890, method 800 provides the requested media item to the at least one of the other users.

Figure 9:
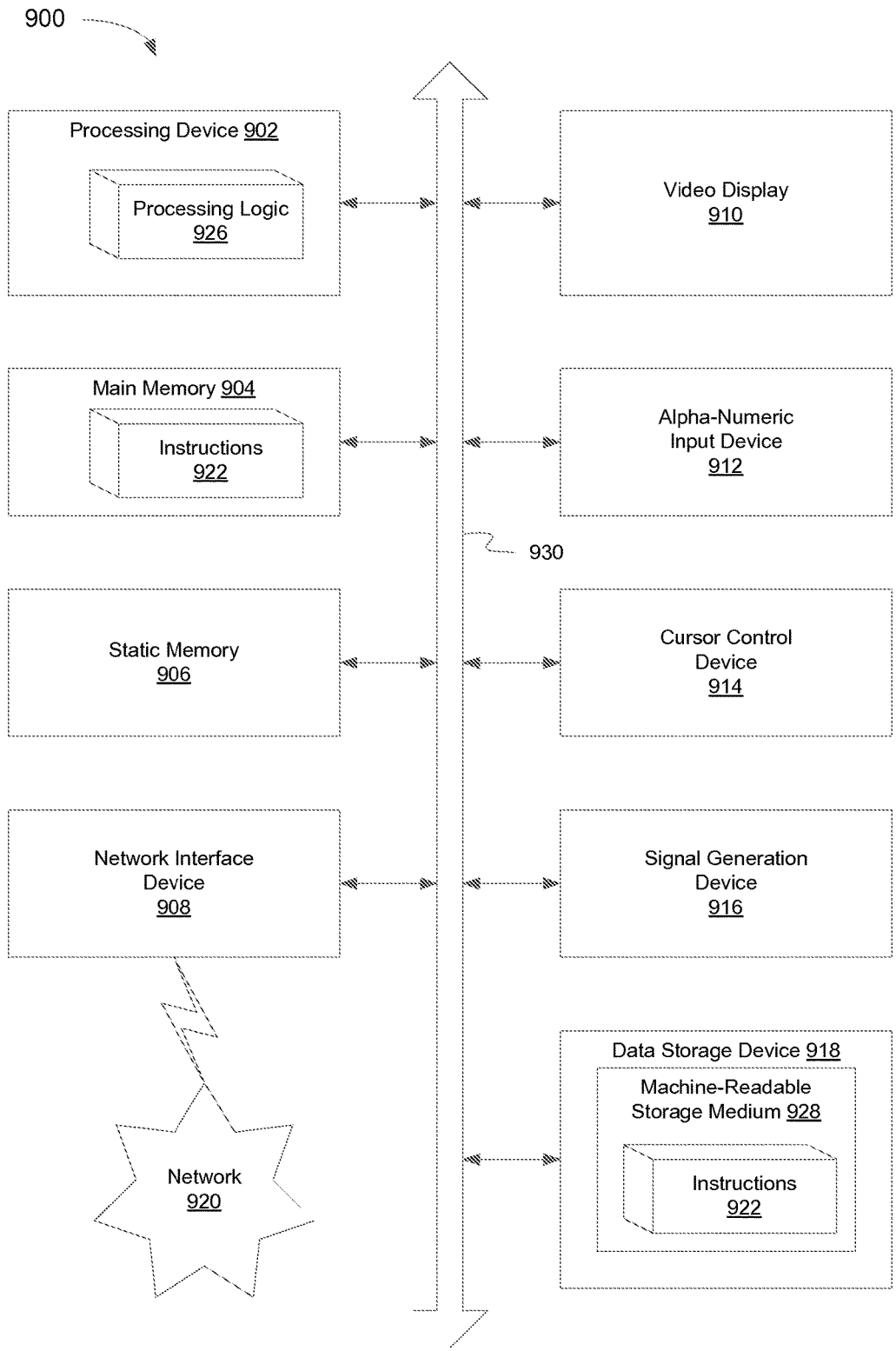
FIG. 9 is a block diagram illustrating a computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a computing device, such as client device 110 or server 130, running proximity detector 140.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 928, on which is stored one or more set of instructions 922 (e.g., software) embodying any one or more of the methodologies of functions described herein. The instructions 922 may also reside, completely or at least partially, within the main memory 904 and/or within the processing device 902 during execution thereof by the computer system 900; the main memory 904 and the processing device 902 also constituting machine-accessible storage media. The instructions 922 may further be transmitted or received over a network 920 via the network interface device 908.

The machine-readable storage medium 928 may also be used to store instructions for identifying proximity history of computer devices, as described herein. While the machine-readable storage medium 928 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
   receiving a request from an origin device to identify a proximity history of the origin device with one or more target devices;
   retrieving first context information from the origin device and second context information from each of the one or more target devices;
   comparing, by a processing device, a first timestamp of the first context information to a second timestamp of the second context information;
   identifying, by the processing device, the second context information from the one or more target devices for which the second timestamp is within a time threshold of the first timestamp, to generate identified context information;
   generating, by the processing device, a list of a subset of the one or more target devices that satisfy a proximity threshold with respect to the origin device based on comparing the first context information with the identified context information;
   generating, by the processing device, an ordered list of events, wherein each event indicates a time interval during which a target device of the subset satisfies the time threshold and the proximity threshold with respect to the origin device; and
   providing the ordered list of events to the origin device to estimate a time-based proximity history between the one or more target devices and the origin device.

2. The method of claim 1, further comprising:
   periodically receiving updated context information from the origin device and from each of the one or more target devices; and
   storing the updated context information and previous context information in a context information record.

3. The method of claim 1, wherein the context information comprises a beacon context indicating a plurality of beacons detected by the origin device and by each of the one or more target devices.

4. The method of claim 1, wherein the context information comprises a location context indicating determined location coordinates of the origin device and of each of the one or more target devices.

5. The method of claim 1, further comprising:
   computing a hash of the context information using a one-way hash function to obfuscate location information in the context information;
   storing the hash of the context information; and
   discarding the retrieved context information.

6. The method of claim 1, further comprising:
   identifying a media item associated with an event in the ordered list of events; and
   annotating the media item to identify user profiles associated with the origin device and with a second target device associated with the event.

7. The method of claim 1, further comprising:
   identifying a media item acquired by a second target device associated with an event in the ordered list of events;
   sending a notification to the origin device indicating that the media item is available;
   receiving a request from the origin device for the media item; and
   providing the media item to the origin device.

8. A server comprising:
   a processing device;
   a memory coupled to the processing device; and
   a proximity detector, executable by the processing device from the memory, to:
      receive a request from an origin device to identify a proximity history of the origin device with one or more target devices;
      retrieve first context information from the origin device and second context information from each of the one or more target devices;
      compare a first timestamp of the first context information from the origin device to a second timestamp of the second context information;
      identify the second context information from the one or more target devices for which the second timestamp is within a time threshold of the first timestamp, to generate identified context information;
      generate a list of a subset of the one or more target devices that satisfy a proximity threshold with respect to the origin device based on comparison of the first context information with the identified context information;
      generate an ordered list of events, wherein each event indicates a time interval during which a target device of the subset satisfies the time threshold and the proximity threshold with respect to the origin device; and
      provide the ordered list of events to the origin device to estimate a time-based proximity history between the one or more target devices and the origin device.

9. The server of claim 8, wherein the proximity detector is further to:
   periodically receive updated context information from the origin device and from each of the one or more target devices; and
   store the updated context information and previous context information in a context information record.

10. The server of claim 8, wherein the context information comprises a beacon context indicating a plurality of beacons detected by the origin device and by each of the one or more target devices.

11. The server of claim 8, wherein the context information comprises a location context indicating determined location coordinates of the origin device and of each of the one or more target devices.

12. The server of claim 8, wherein the proximity detector is further to:
compute a hash of the context information using a one-way hash function to obfuscate location information in the context information;
store the hash of the context information; and
discard the retrieved context information.

13. The server of claim 8, wherein the proximity detector is further to:
identify a media item associated with an event in the ordered list of events; and
annotate the media item to identify user profiles associated with the origin device and with a second target device associated with the event.

14. The server of claim 8, wherein the proximity detector is further to:
identify a media item acquired by a second target device associated with an event in the ordered list of events;
send a notification to the origin device indicating that the media item is available;
receive a request from the origin device for the media item; and
provide the media item to the origin device.

15. A non-transitory machine-readable storage medium storing instructions which, when executed, cause a processing device to perform operations comprising:
receiving a request from an origin device to identify a proximity history of the origin device with one or more target devices;
retrieving first context information from the origin device and second context information from each of the one or more target devices;
comparing, by the processing device, a first timestamp of the first context information to a second timestamp of the second context information;
identifying, by the processing device, the second context information from the one or more target devices for which the second timestamp is within a time threshold of the first timestamp, to generate identified context information;
generating a list of a subset of the one or more target devices that satisfy a proximity threshold with respect to the origin device based on comparing the first context information with the identified context information;
generating an ordered list of events, wherein each event indicates a time interval during which a target device of the subset satisfies the time threshold and the proximity threshold with respect to the origin device; and
providing the ordered list of events to the origin device to estimate a time-based proximity history between the one or more target devices and the origin device.

16. The non-transitory machine-readable storage medium of claim 15, the operations further comprising:
periodically receiving updated context information from the origin device and from each of the one or more target devices; and
storing the updated context information and previous context information in a context information record.

17. The non-transitory machine-readable storage medium of claim 15, wherein the context information comprises at least one of a beacon context indicating a plurality of beacons detected by the origin device and by each of the one or more target devices or a location context indicating determined location coordinates of the origin device and of each of the one or more target devices.

18. The non-transitory machine-readable storage medium of claim 15, the operations further comprising:
computing a hash of the context information using a one-way hash function to obfuscate location information in the context information;
storing the hash of the context information; and
discarding the retrieved context information.

19. The non-transitory machine-readable storage medium of claim 15, the operations further comprising:
identifying a media item associated with an event in the ordered list of events; and
annotating the media item to identify user profiles associated with the origin device and with a second target device associated with the event.

20. The non-transitory machine-readable storage medium of claim 15, the operations further comprising:
identifying a media item acquired by a second target device associated with an event in the ordered list of events;
sending a notification to the origin device indicating that the media item is available; and
receiving a request from the origin device for the media item; and
providing the media item to the origin device.

* * * * *